US008233045B2

(12) United States Patent
Luo et al.

(10) Patent No.: US 8,233,045 B2
(45) Date of Patent: Jul. 31, 2012

(54) METHOD AND APPARATUS FOR DISTORTION CORRECTION AND IMAGE ENHANCING OF A VEHICLE REAR VIEWING SYSTEM

(75) Inventors: Yun Luo, Livonia, MI (US); Chris St. John, Northville, MI (US); John Prainito, Clarkston, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 1326 days.

(21) Appl. No.: 11/879,117

(22) Filed: Jul. 16, 2007

(65) Prior Publication Data
US 2009/0021609 A1 Jan. 22, 2009

(51) Int. Cl.
*H04N 7/18* (2006.01)
*H04N 9/47* (2006.01)
(52) U.S. Cl. .................. 348/148; 348/143; 348/147
(58) Field of Classification Search .................. None
See application file for complete search history.

(56) References Cited

U.S. PATENT DOCUMENTS

| 6,405,132 | B1 * | 6/2002 | Breed et al. ............... 701/301 |
| 6,587,760 | B2 | 7/2003 | Okamoto |
| 6,593,960 | B1 | 7/2003 | Sugimoto et al. |
| 6,618,672 | B2 | 9/2003 | Sasaki et al. |
| 6,985,171 | B1 | 1/2006 | Kuriya et al. |
| 7,006,129 | B1 | 2/2006 | McClure |
| 7,057,500 | B1 | 6/2006 | Belloso |
| 7,136,754 | B2 * | 11/2006 | Hahn et al. ............... 701/301 |
| 2002/0118292 | A1 | 8/2002 | Baron |
| 2003/0090568 | A1 | 5/2003 | Pico |
| 2005/0031169 | A1 * | 2/2005 | Shulman et al. ........... 382/104 |
| 2005/0128294 | A1 | 6/2005 | Green et al. |
| 2006/0132601 | A1 | 6/2006 | Kukita et al. |
| 2007/0206835 | A1 * | 9/2007 | Abe .......................... 382/104 |
| 2008/0068520 | A1 * | 3/2008 | Minikey et al. ............ 349/11 |
| 2008/0304705 | A1 * | 12/2008 | Pomerleau et al. ........ 382/103 |

FOREIGN PATENT DOCUMENTS

| JP | 2002-335438 A | 11/2002 |
| JP | 2006-050451 A | 2/2006 |
| KR | 10-2007-0005069 | 1/2007 |

OTHER PUBLICATIONS

Huabin et al., "Accurate and Stable Vision in Robot Soccer", *2004 8th International Conference on Control, Automation, Robotics and Vision*, Kunming, China, Dec. 6-9, 2004.
Zhang, Z.: "Flexible Camera Calibration by Viewing a Plane from Unknown Orientations", *IEEE 1999*.

* cited by examiner

*Primary Examiner* — Thu Nguyen
*Assistant Examiner* — Angela Widhalm
(74) *Attorney, Agent, or Firm* — Tarolli, Sundheim, Covell & Tummino LLP (57) ABSTRACT

An image enhancing system for a vehicle comprises a display unit for displaying modified images and an imaging device for receiving captured images—enhanced by the image enhancing system. The system further includes an image enhancing module in communication with the display unit and the imaging device—such that pixels located in the captured images are enhanced by repositioning the pixels from a first position to a second position via a transfer operation.

27 Claims, 5 Drawing Sheets

METHOD AND APPARATUS FOR DISTORTION CORRECTION AND IMAGE ENHANCING OF A VEHICLE REAR VIEWING SYSTEM

TECHNICAL FIELD

The present invention is directed to a vehicle rear viewing system and more particularly, to a method and apparatus for distortion correction and image enhancing of a vehicle rear viewing system.

BACKGROUND OF THE INVENTION

Operating a motor vehicle in reverse can be a frustrating and difficult task. These frustrations largely result from a drivers' inability to see objects behind the vehicle while proceeding in reverse despite rearview mirrors and windows. The areas blocked from a driver's view are the result of the vehicle structure due to dead angle areas hidden from view through the vehicles' mirrors (referred to as blind spots), and because of other causes.

The increasing popular sport utility vehicle ("SUV") suffers from an even higher degree of difficulty in seeing during an attempt to travel in reverse as compared to a passenger vehicle. To aid the driver in becoming more aware of the surroundings behind the SUV, rearview camera systems have been proposed. Such camera systems provide a display of the rearview camera image to the driver. Such camera systems use a wide angle lens that distorts the rearview image.

SUMMARY OF THE INVENTION

The present invention relates to an image enhancing system for a vehicle comprising a display unit for displaying modified images and an imaging device for receiving captured images enhanced by the image enhancing system. The system further includes an image enhancing module in communication with the display unit and the imaging device such that pixels located in the captured images are enhanced by repositioning the pixels from a first position to a second position via a transfer operation.

The present invention also relates to a method of enhancing an image in a vehicle imaging system comprising the steps of receiving captured images by at least one imaging device located on the vehicle and communicating the captured images to an image enhancing module. The method further includes enhancing the captured images such that pixels located in the captured images are repositioned from a first position to a second position by a transfer operation to form modified images. The method further communicates the modified images from the enhancing module to a display unit located in the vehicle.

The present invention further relates to an image enhancing system for improving images received by an imaging device located on a vehicle. The image enhancing system comprises at least one camera located on the vehicle. The camera includes a pixel array for receiving real-time captured images within the camera field of view. The image enhancing system further comprises a computing unit having an image enhancing module in communication with the camera for improving the captured images by repositioning pixels in the captured images from a first position to a second position in accordance with a transfer operation performed by the image enhancing module such that the repositioning of the pixels form enhanced images. A display unit is in communication with the computing unit and is located within the vehicle for displaying the enhanced images.

The present invention further relates to a rearview image enhancing system for a vehicle comprising a display unit for displaying modified images enhanced by the image enhancing system and an imaging device for receiving captured images enhanced by the image enhancing system. The system further comprises an image enhancing module in communication with the display unit and the imaging device such that pixels located in the captured images are clustered and segmented to form at least one area of interest by referencing the pixels from a ground plane in the captured images to form the modified images.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
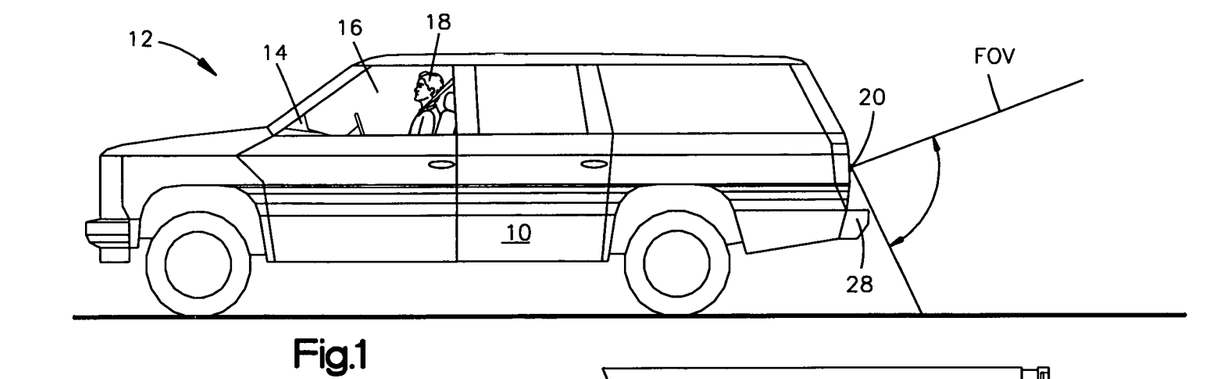
FIG. 1 is a schematic diagram illustrating a vehicle having a rearview distortion correcting and image enhancing system in accordance with one example embodiment of the present invention.

Referring to FIG. 1, a vehicle 10 includes a rearview distortion correcting and image "DCIE" enhancing system 12, in accordance with one example embodiment of the present invention, a display unit 14 located in the vehicle cabin 16 for viewing by the vehicle operator 18. The rearview DCIE system 12 provides real-time, wide angle video images to the operator 18 of the area behind the vehicle 10 through an imaging device 20. The imaging device 20 includes, for example a camera utilizing charge-coupled device ("CCD") or complementary metal oxide semiconductor ("CMOS") sensor technology for capturing a real-time continuous images illustrated as a field-of-view ("FOV") of the imaging device 20.

Figure 2A:
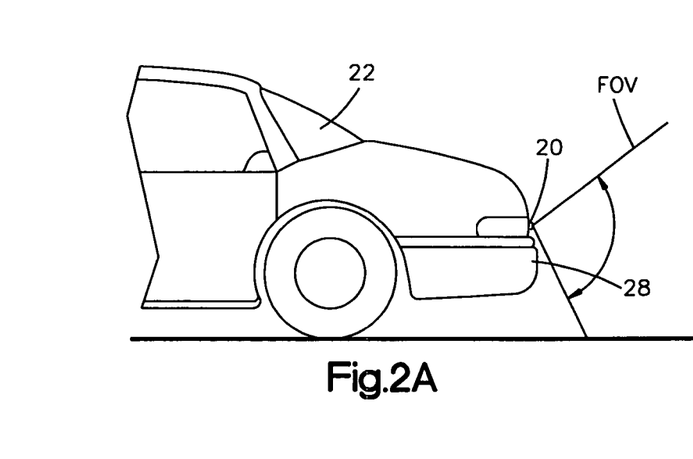
FIG. 2A is a diagram illustrating the mounting of an imaging device on a passenger vehicle equipped with the rearview enhancing system in accordance with one example embodiment of the present invention.
Figure 2B:
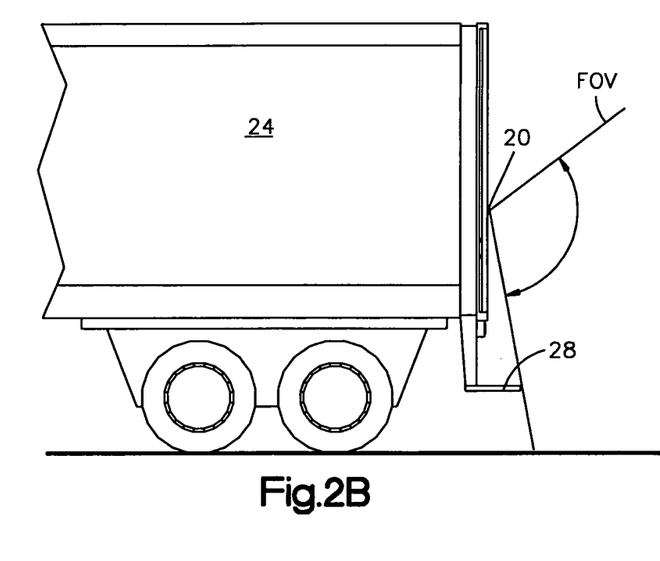
FIG. 2B is a diagram illustrating the mounting of an imaging device on a cargo vehicle equipped with the rearview distortion correcting and image enhancing system in accordance with the present invention.

While FIG. 1 illustrates the rearview DCIE system 12 being adapted to a sport utility type vehicle (SUV), FIGS. 2A and 2B illustrate that the system could also be adapted to a passenger vehicle 22, cargo transport vehicle 24, or any other type of movable vehicles or equipment such as fork trucks and/or tractor trailers without departing from the spirit and scope of the claimed invention. For brevity, future references to vehicle 10 are intended to cover all the above-mentioned types of vehicles and/or equipment unless specifically stated.

Figure 3:
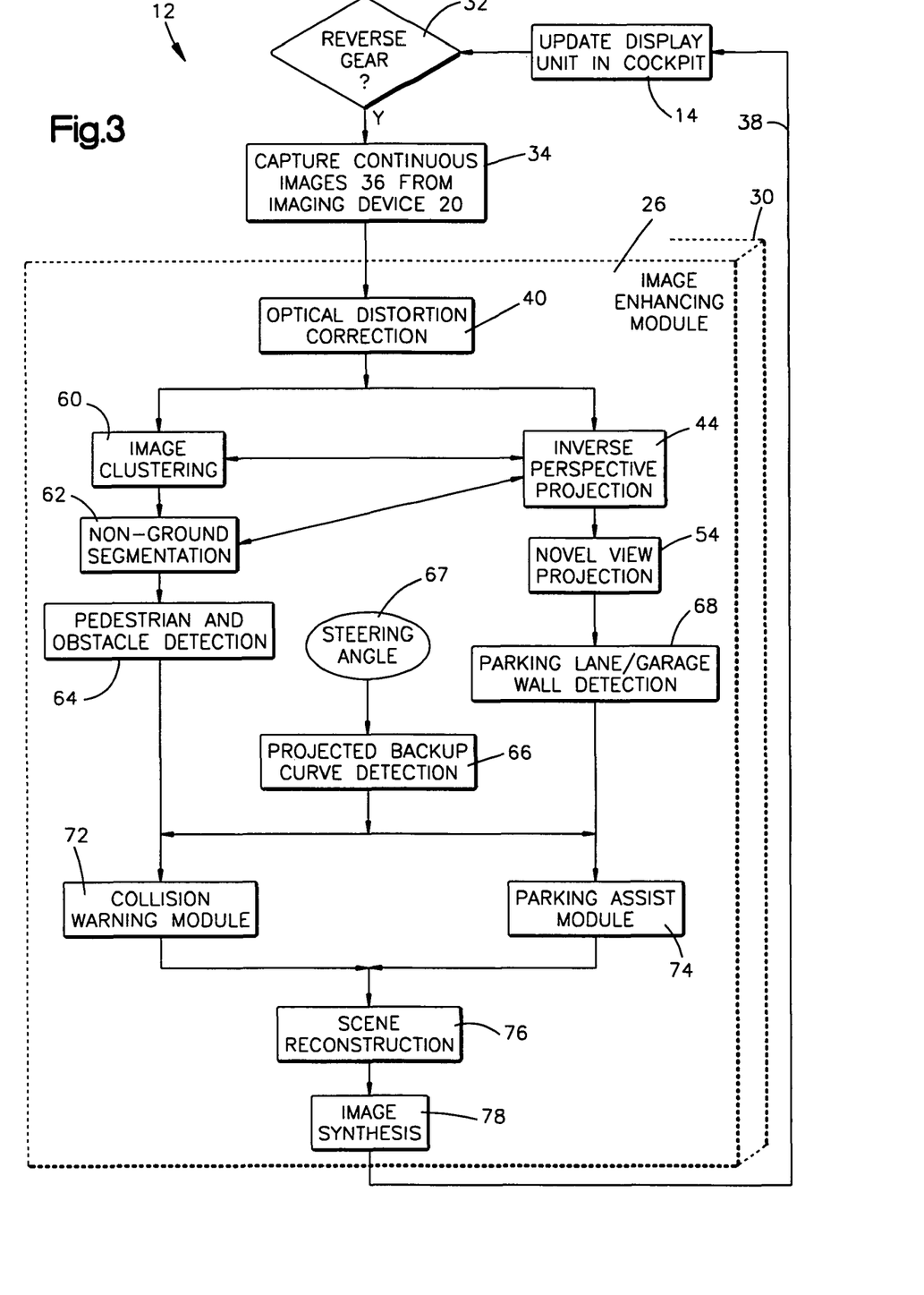
FIG. 3 is a flow chart illustrating a control process for controlling a rearview distortion correcting and image enhancing system in accordance with one example embodiment of the present invention.

The FOV captured by the imaging device 20 is processed and enhanced by an image enhancing module 26 associated with the rearview enhancing system 12 in accordance with the control process illustrated in FIG. 3. The imaging enhancing module 26 uses part of the vehicle as a reference (e.g. part of the vehicle bumper or tailgate 28) when modifying the continuous images that are transmitted as video data to the display unit 14. The display unit 14 could be a monitor, liquid crystal display (LCD), navigation screen, or other known video displaying devices that, in the present invention, allows the operator 18 to view the area behind the vehicle 10 with an enhanced undistorted view via the image enhancing module 26, substantially eliminating blind spots and dead angle areas.

The image enhancing module 26 is located in the vehicle 10 and includes processing capabilities performed by a computing unit 30, such as a digital signal processor (DSP), field programmable gate array (FPGA), microprocessors, or application specific integrated circuits (ASIC), or a combination thereof that include programming capabilities, for example, by computer readable media such as software or firmware embedded into a microprocessor including flash Read Only Memory (ROM) or as a binary image file that can be programmed by a user. The image enhancing module 26 can be integral with the imaging device 20 or display unit 14 or remotely located in communication (wire or wireless) with both the imaging device and display unit.

The initiation of the rearview enhancing system 12 of FIG. 3 occurs when the operator 18 selectively engages the vehicle 10 for reverse operation. This is typically achieved by placing the vehicle 10 in a reverse gear 32. At least one imaging device 20 captures in step 34 continuous images 36 from the rear of the vehicle 10 and communicates the continuous images 36 to the image enhancing module 26. The image enhancing module 26 modifies the continuous images 36 and transmits the enhanced images 38 via video data to the display unit 14 to aid the driver.

Optical Distortion Correction

Optical distortion correction in step 40 is one enhancing function applied to the continuous images 36 by the image enhancing module 26. Optical distortion correction 40 facilitates the removal of a perspective effect and visual distortion caused by a wide angle lens used in the imaging device 20. The optical distortion correction 40 utilizes a mathematical model of the distortion to determine the correct position of the pixels captured in the continuous images 36. The mathematical model also corrects the pixel position of the continuous images 36 as a result of differences between the width and height of a pixel unit due to the aspect ratio produced by wide angle lenses.

The optical distortion correction in step 40 uses a mathematical model that is represented by the following equations in which the actual pixel positions captured by the continuous images 36 are represented as a single image point $X_a, Y_a$ and are then transferred to a respective corrected position $X_c, Y_c$, where $$X_c = s * \cos \phi * X_a * (1 + k_1 \rho^2 + k_2 \rho^4) \quad \text{Eq. 1}$$

$$Y_c = (s * \sin \phi * X_a + \cos \phi * Y_a)(1 + k_1 \rho^2 + k_2 \rho^4) \quad \text{Eq. 2}$$

In the above equations, s is the aspect ratio of pixel unit and $\phi$ is the rectification angle. The lens distortion coefficients are $k_1$ and $k_2$ and $$\rho = ((s * \cos \phi * X_a)^2 + (s * \sin \phi * X_a + \cos \phi * Y_a)_2)^{1/2} \quad \text{Eq. 3}$$

For certain lenses used by the imaging device 20, the distortion coefficient values $k_1$ and $k_2$ can be predetermined to help eliminate the barrel distortion created by use of a wide angle lens. The distortion coefficient values are used for real-time correction of the continuous images 36, e.g. floating point calculations. Those skilled in the art will also appreciate these values can also generate offline lookup tables.

Figure 4A:
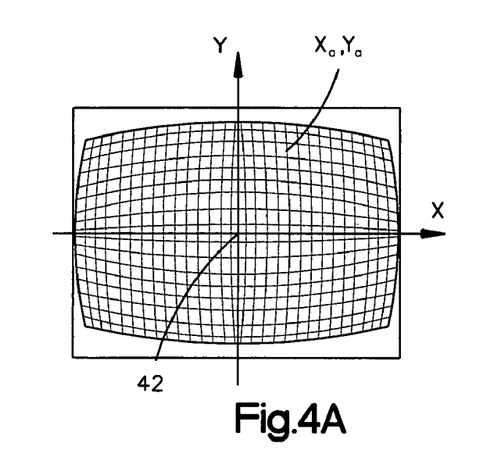
FIG. 4A is a schematic diagram of a distorted image captured by an imaging device.

The distortion coefficient values $k_1$ and $k_2$ can be further tuned by using an image captured in the continuous images 36 having known straight lines, for example, a center of distortion 42 illustrated in FIG. 4A, which depicts a captured continuous image 36. In accordance with this aspect of the present invention, the center of distortion 42 is located by analyzing the captured continuous image 36 for the straightest horizontal and vertical lines, the center being located where the two lines intersect. The captured image can then be corrected with different or fine tuned distortion coefficient values $k_1$ and $k_2$ by trial and error. For example, if the lines at one side of the image are "barreled" and lines at the other side of the image are "pin-cushioned", the center offset needs to move towards the pin-cushioned side. When a value has been found that corrects the distortion sufficiently, the values for the center of distortion 42 and distortion coefficient values $k_1$ and $k_2$ can be used in the optical distortion correction 40 mathematical model. Stated another way, a calibration procedure occurs by using the straightest horizontal and vertical lines in a captured image pattern. The straightest horizontal and vertical lines assist in determining the values of the distortion coefficients $k_1$ and $k_2$, which are used for calibrating the above optical distortion equations 1 and 2.

Figure 4B:
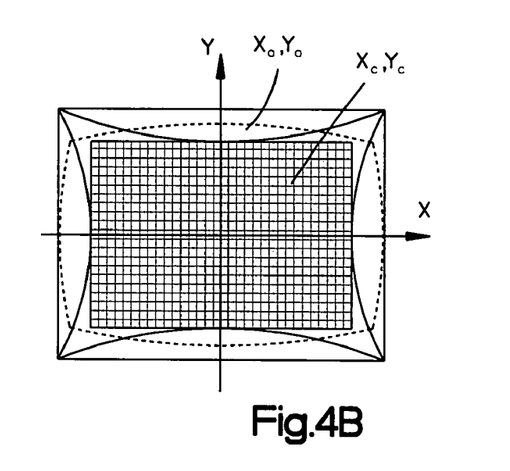
FIG. 4B is a schematic diagram of a captured image that has been processed by the rearview distortion correcting and image enhancing system in accordance with one example embodiment of the present invention.

Referring to FIG. 4A, an image captured from the continuous images 36 is shown prior to image enhancement by the optical distortion correction 40. FIG. 4A illustrates both the center of distortion 42 and the actual pixel positions represented by the single image point $X_a, Y_a$. FIG. 4B illustrates a captured enhanced image depicting the transfer of the image point $X_a, Y_a$ to its respective corrected position $X_c, Y_c$ achieved by the tuning techniques discussed during the use of the mathematical model in the optical distortion correction 40. The grid on the images in FIGS. 4A and 4B are for illustrative and quality assurance purposes depicting the transformation that occurs to the entire image enhanced by the optical distortion correction 40. In particular, the lines in the grid of FIG. 4B are now substantially straight and the original perimeter of the distorted image in FIG. 4A is overlaid.

Inverse Perspective Projection

Inverse perspective projection 44 is an enhancing function applied to the continuous images 36 by the image enhancing module 26. The angle of view acquired by the imaging device 20 and the distance of the objects therefrom generates at least two imaging problems. First, the angle of view contributes to associate different information content to each pixel captured, and second is the perspective effect produced by wide angle lenses. To resolve these problems, the inverse perspective projection 44 applies a geometrical transform or inverse perspective mapping (IPM) transform 46 to remove the perspective effect from the acquired image, remapping it into a new two-dimensional domain or remapped domain 48.

Figure 5:
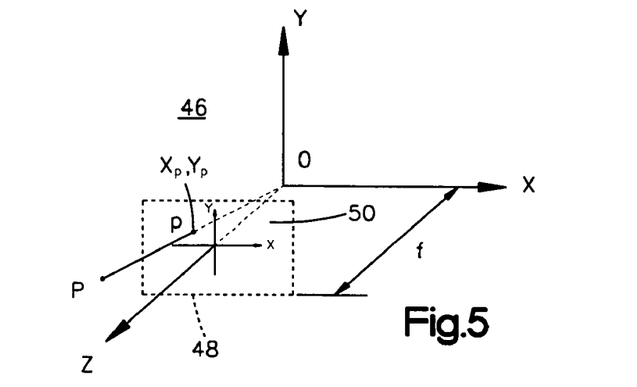
FIG. 5 is a graphical illustration of a captured image that is optically enhanced and remapped by an image enhancing module of the present invention.

FIG. 5 illustrates a captured image point P that is enhanced by the image enhancing module 26 through the application of the inverse perspective projection 44. The coordinates of point P is represented by X, Y, and Z of FIG. 5, where Z is the optical axis of the imaging device 20. The captured image point P as projected onto a pixel sensor array is encumbered with the perspective effect problems and incorrect information content problems discussed above. To eliminate such problems, the inverse perspective projection utilizes the IPM transform 46 to remap the point P and image (by remapping all the pixels in the captured image) into the remapped domain 48. The IPM transform is represented by the following equations:

$$x_p = f\frac{X}{Z} \quad \text{Eq. 4}$$

and $$y_p = f\frac{Y}{Z} \quad \text{Eq. 5}$$

wherein $x_p$ and $y_p$ are the remapped coordinates projected into the remapped domain 48 and parameter $f$ is the distance of the remapped domain 48 to the origin "O" along the Z or optical axis of the imaging device 20.

Projection of the all the pixels from the distorted image onto the remapped domain 48 via IPM transform 46 creates an enhanced image plane 50. The pixel information content in the enhanced image plane 50 is homogeneously distributed among all the pixels. The enhanced image plane 50 represents one of the several enhanced image planes that form the continuous enhanced images 38 sent to the display unit of the vehicle 10. The inverse perspective projection 44 utilizing the IPM transform 46 can be performed on the captured continuous images 36 in isolation or after the optical distortion correction 40 is performed on the images as illustrated in FIG. 3.

The application of the IPM transform 46 requires information relating to the specific acquisition conditions (e.g. imaging device position, orientation, optics) and requires some assumptions (a-priori assumptions) about the scene represented in the image. As such, the IPM transform 46 can be used in structured environments, where, for example, the imaging device 20 is mounted in a fixed position or in situations where the calibration of the system and surrounding environment can be sensed via other types of sensors.

Figure 8:
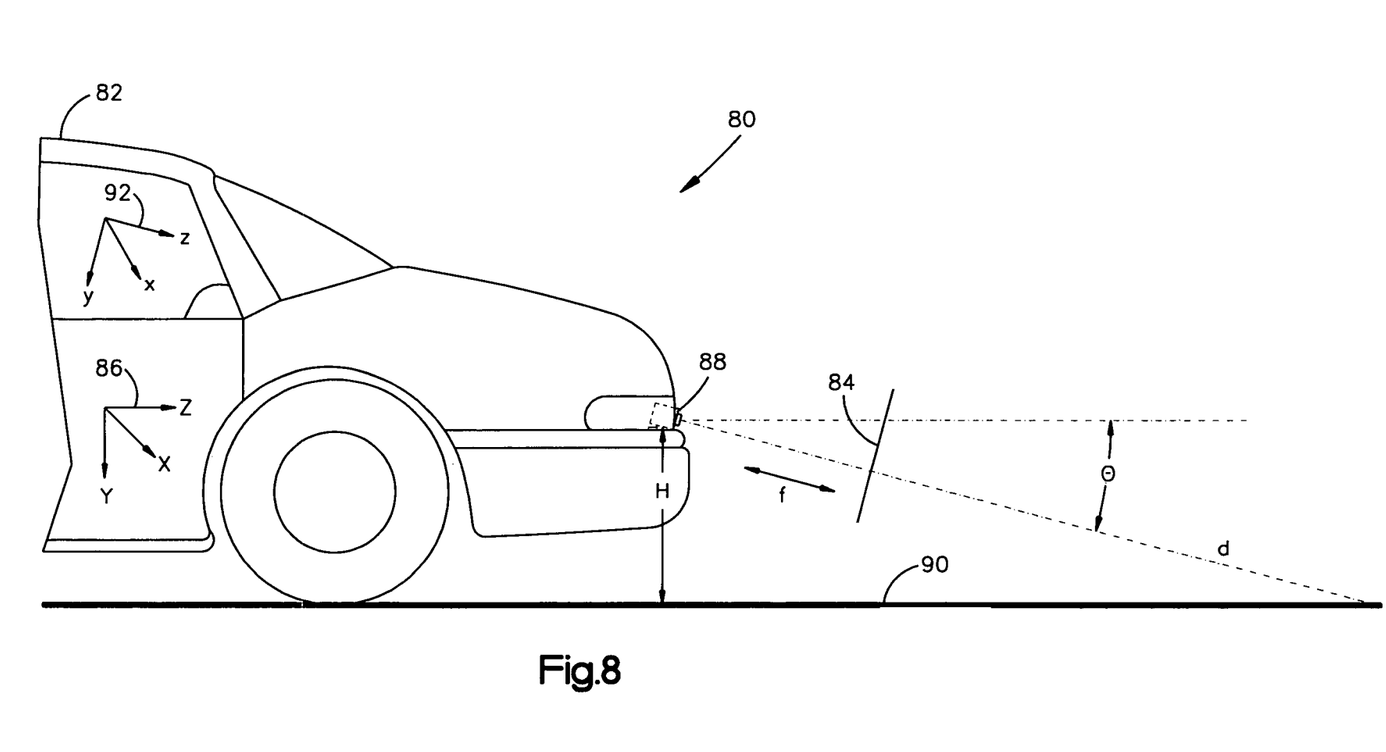
FIG. 8 is a graphical illustration from a side view perspective of an example embodiment of a rearward imaging device on a cargo vehicle equipped with the rearview enhancing system constructed in accordance with an example embodiment of the present invention.

FIG. 8 illustrates from a side view perspective an example of a rearward looking imaging system 80 in accordance with an aspect of the present invention for a vehicle 82 utilizing a transform of image data from a two-dimensional image plane 84 to a three-dimensional world coordinate system 86 representing the space in the rear of the vehicle 82, as a horizontal Z-axis oriented along a longitudinal axis of the vehicle, a vertically oriented Y-axis, and a horizontal X-axis oriented perpendicular to the Y-axis and the Z-axis. Through use of this transform, the distance of objects viewed in the image plane 84 from the vehicle, specifically along the Z-axis, can be determined. To this end, a camera 88 mounted on or within the vehicle is configured to image a space in the rear of the vehicle. In the illustrated example, the camera is angled downward toward a ground plane 90 by a predetermined pitch angle, $\Theta$.

The image captured at the camera is analyzed to determine the distance of objects within the image from the vehicle. To this end, the two-dimensional image plane is translated to a three-dimensional camera coordinate system 92, with the x-axis and y-axis of the camera coordinate system 92 representing vertical and horizontal axes, respectively, within the image plane 84. A z-axis extends along the field of view of the camera, normal to the image plane 84. Because of the pitch of the camera and its location within the vehicle, the camera coordinate system 92 is slightly rotated around the X-axis and translated vertically a distance equal to the height, H, of the camera from the ground vertically relative to the world coordinate system 86.

To simplify the transformation of the image into the camera coordinates, it is helpful to assume that the ground plane 90 is a flat surface. For a camera 88 having pixels of width $w_u$, height $w_v$, and a focal length of f, the relationship between camera coordinates (x, y, z) and image coordinates (u, v) can be expressed as:

$$u = u_0 + \frac{f*x}{w_u*z} \quad \text{Eq. 6}$$

$$v = v_0 + \frac{f*y}{w_v*z} \quad \text{Eq. 7}$$

where $(u_0, v_0)$, represents a center point of the image plane. A horizon line, $v_h$, within the image plane can be determined from the characteristics of the camera as described above and the known pitch angle, $\Theta$, of the camera as:

$$v_h = v_0 - \frac{f\tan(\theta)}{w_v} \quad \text{Eq. 8}$$

From Eq. 7 above, Eq. 8 can be rewritten as:

$$\frac{(v - v_h)w_v}{f} = \frac{y}{z} + \tan(\theta) \quad \text{Eq. 9}$$

Since the camera coordinate system 92 represents the world coordinate system 86 with a rotation around the X-axis equal to the pitch angle, $\Theta$, and a translation along the Y-axis equal to the camera height, H, the translation between the camera coordinates and the world coordinates can be represented as X=x, Y=y[cos($\Theta$)]-H, and Z=z[cos($\Theta$)].

Accordingly, from Eq. 9 above, the distance, d, between a given point on the ground plane (X, Y=0, Z=d) and the vehicle can be expressed as:

$$\begin{cases} d = \dfrac{fH}{w_v v - w_v v_h - f\tan(\theta)} & \text{if } v > v_h \\ \quad\quad \infty & \text{if } v \leq v_h \end{cases} \quad \text{Eq. 10}$$

In practice, to determine the distance to a given object within the image, the intersection of the object with the ground plane can be determined, and the vertical location of the intersection within the image can be utilized to calculate the distance, d, to the object. Accordingly, the distance of various objects within the field of view of the camera can be determined without the use of additional sensors, significantly reducing the cost of the system 80.

Figure 6A:
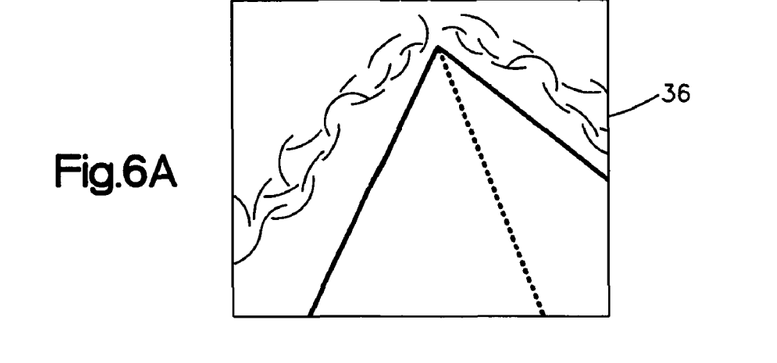
FIG. 6A is a graphical illustration of a distorted image capture by an imaging device.

For the rearview enhancing system 12 of the present invention, the intrinsic and extrinsic parameters are known from prior calibrations, including the mounting position, yaw, and pitch angles of the imaging device 20. The ground near the vehicle 10 is assumed to be planar and the employment and the original captured continuous image 36 illustrated in FIG. 6A is modified by the IPM transform 46 in the image enhancing module 26 to produce the enhanced image 38. The enhanced image 38 provides a bird's eye view of the area behind the vehicle and is projected onto the display unit 14 for the operator 18 of the vehicle 10.

Figure 6B:
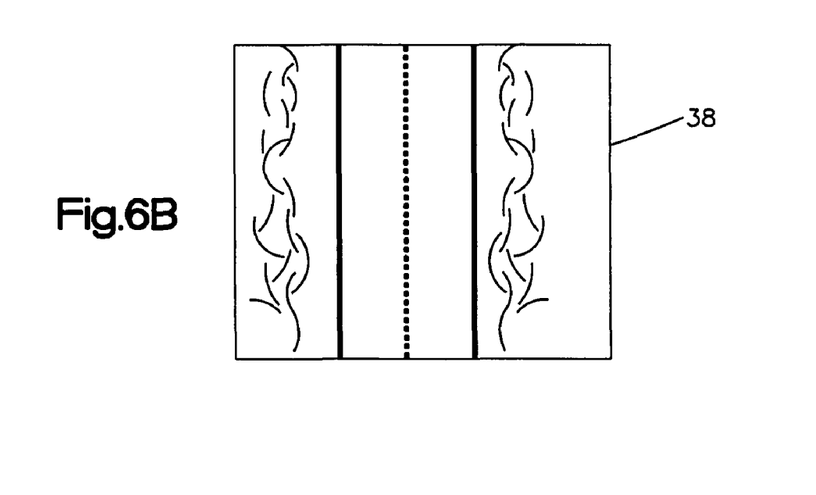
FIG. 6B is a graphical illustration of a captured image that is optically processed and remapped by an image enhancing module of the present invention.
Figure 6C:
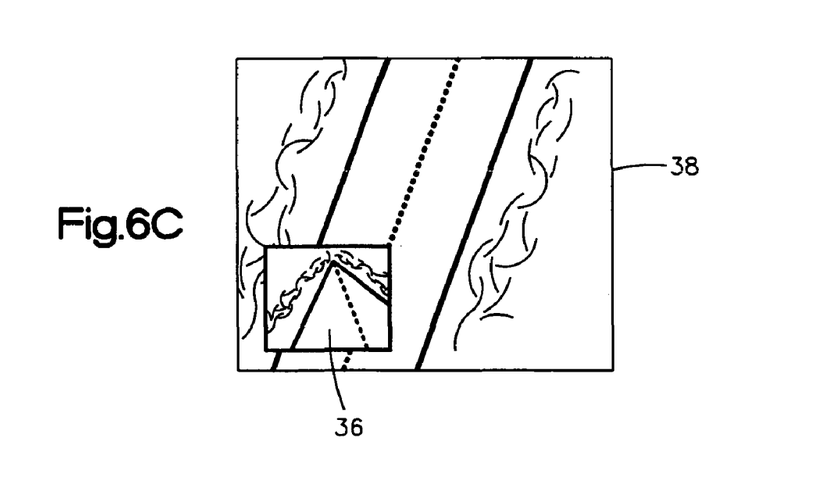
FIG. 6C is a graphical illustration of a three-dimensional reconstruction of a display unit projecting both the distorted image of FIG. 6A and the optically enhanced and remapped image of FIG. 6B.

FIG. 6C is an exemplary embodiment of the present invention in which the display unit 14 provides a three-dimensional (3D) reconstruction of a combination of the original captured continuous image 36 and the enhanced image 38.

Novel View Projection

Novel view projection 54 is another enhancing function applied to the continuous images 36 by the image enhancing module 26. The perspective effect caused by wide angle lenses produce distortions in the size of objects imaged. Such distortion problems are not eliminated or even addressed in conventional imaging sensors.

Figure 7:
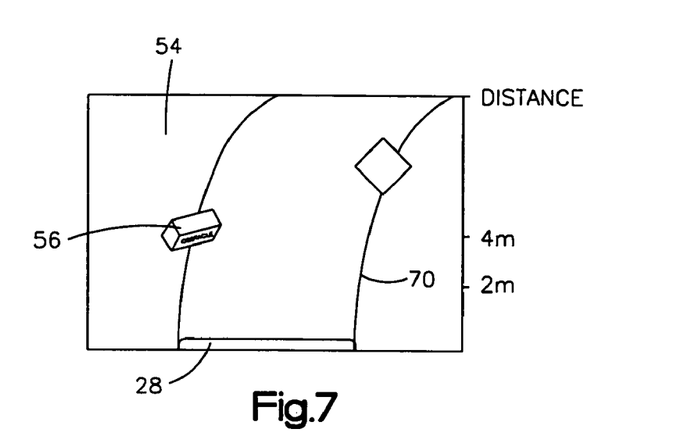
FIG. 7 is a graphical illustration of a captured image that is optically processed to produce a novel view projection by an image distortion correcting and image enhancing module of the present invention.

The image enhancing module's employment of the novel view projection function 54 eliminates such distortion problems. The novel view projection 54 generates new images from a top view and side view so that the distance from the back of the vehicle 10 to any object or obstacle 56 is linearly proportional without distortion, as illustrated in FIG. 7. The image enhancing module 26 uses a reference point, such as the vehicle bumper or tailgate 28 in creating the novel view projection 54 and may use more than one imaging device 20. The novel view projection 54 is produced onto the display unit 14 for the vehicle 10 operator 18 and may include a scale 58 for the operator as a further reference to distance.

Novel view projection 54 can be applied to the captured continuous image 36 in isolation or in combination with the other functions performed by the image enhancing module 26, including inverse perspective projection 44 and optical distortion correction 40 or both.

Image Clustering and Non-ground Segmentation

Image clustering 60 and non-ground segmentation 62 are two additional enhancing functions applied to the continuous images 36 by the image enhancing module 26. The image clustering 60 and non-ground segmentation 62 functions use multiple image cues, including color, texture, and pixel intensity to find pixel regions, blobs or clusters that share similar characteristics that are tagged or labeled. Features are extracted from each pixel region/blob/cluster to form an area of interest. Detection and recognition are performed based on the extracted features, using such techniques as template matching, modeling, pattern cognition, and the like.

The rearview enhancing system 12 and more specifically, the image enhancing module 26 employs the above techniques in image clustering 60 and non-ground segmentation 62 to separate and recognize the ground and non-ground regions for obtaining areas of interest.

The identity of the ground region can be mapped assuming all the pixels in the ground region fit on the plane ground. The identity of the non-ground segmentation 62 regions can be further clustered and recognized to be certain objects, for example the objects could include obstacles, pedestrians, etc. These non-ground recognized objects can pop-up on the display unit 14, similar to the obstacle 56 illustrated in FIG. 7. Any object that extends vertically from the ground plane can be a recognized non-ground object. As such, the non-ground recognized objects can be located by their position relative to the ground plane. The non-ground recognized objects can then be used to generate the synthesized image discussed further below relating to FIG. 7.

The non-ground regions are assumed to be a planer surface that can be remapped after exercising the IPM transform 46 on the captured continuous image 36. Other non-ground regions are also analyzed by the image enhancing module 26 using image clustering 60 and non-ground segmentation 62, such as pedestrian and obstacle detection 64, projected backup curve detection 66, and a parking lane/garage wall detection 68 used to detect parking lane marks on the ground or parking walls for parking spaces located in, for example, a parking garage. The image enhancement allows objects, lines, and walls to stand out from the planer surface making them more easily detected or recognized by the operator 18.

Information Fusion

Utilizing known information provided by the steering angle 67 of the vehicle 10, a backup path 70 can be predicted by the computing unit 30 and provided on the display unit 14. This information is used in a collision warning module 72, which is another function performed by the image enhancing module 26. The described pedestrian and obstacle detection 64, projected backup curve detection 66, and a parking lane/garage wall detection 68 made possible by the image clustering 60 and non-ground segmentation 62 techniques are also used by the collision warning module 72. The computing unit 30 can predict the potential for collision and highlight the obstacles or pedestrians found in the backup path 70 warning the operator 18 on the display unit 14.

Similar to the collision warning module 72, the rearview enhancing system 12 provides a parking assist module 74. The described pedestrian and obstacle detection 64, projected backup curve detection 66, and a parking lane/garage wall detection 68 made possible by the image clustering 60 and non-ground segmentation 62 techniques are used by the parking assist module 74. The parking assist module 74 can facilitate the backing into a parking space or parallel parking in a manual or automated operating mode of the vehicle 10.

Scene Reconstruction and Image Synthesis

FIG. 7 further provides an example embodiment of a final constructed scene that is viewed by the operator 18 on the display unit 14. A top-view, non-photo-realistic illustration is generated, including distance information in the form of a scale 58, with the obstacle 56 acting as a pop-up and pedestrians highlighted. The backing up path 70 is drawn with a boundary and is real-time adjusted with the steering angle 67 of the vehicle 10. The non-photo-realistic illustration of FIG. 7 that is viewed on the display unit 14 is much easier for the operator 18 to understand and assist while backing the vehicle 10. At the same time as FIG. 7 is shown on the display unit 14, the original image with detailed information will be displayed on the display unit 14 as visual support. The original image pixels can be super-imposed into the top-view perspective to synthesize a real scene from the top-view as illustrated in FIG. 6B.

From the above description of the invention, those skilled in the art will perceive improvements, changes and modifications. Such improvements, changes and modifications within the skill of the art are intended to be covered by the appended claims.

Having described the invention, the following is claimed:
1. An image enhancing system for a vehicle comprising:

a display unit for displaying modified images enhanced by the image enhancing system;

an imaging device for receiving captured images enhanced by said image enhancing system;

an image enhancing module in communication with said display unit and said imaging device such that pixels located in said captured images are enhanced by repositioning said pixels from a first position to a second position through a transfer operation to form said modified images, said first position being expressed by $(X_a, Y_a)$, said second position being expressed by $(X_c, Y_c)$, and said transfer operation being performed in accordance with the formulas:

$$X_c = s*\cos\phi*X_a*(1+k_1\rho^2+k_2\rho^4) \text{ and}$$

$$Y_c = (s*\sin\phi*X_a+\cos\phi*Y_a)(1+k_1\rho^2+k_2\rho^4)$$

wherein, s is an aspect ratio of pixel unit, $\phi$ is a rectification angle, the lens distortion coefficients are $k_1$ and $k_2$ and $\rho = ((s*\cos\phi*X_a)^2+(s*\sin\phi*X_a+\cos\phi*Y_a)^2)^{1/2}$.

2. The image enhancing system of claim 1 wherein said transfer operation includes at least one coefficient that is adjusted by analyzing said captured images.

3. The image enhancing system of claim 2 wherein said analyzing the captured images includes a calibration procedure where coefficients in the transfer operation are defined by locating substantially horizontal and/or substantially vertical lines in said captured images.

4. The image enhancing system of claim 3 wherein said substantially vertical and horizontal lines include lines forming a center of distortion about said captured image.

5. The image enhancing system of claim 1 wherein said transfer operation further comprises an inverse perspective mapping transform.

6. The image enhancing system of claim 2 wherein said transfer operation further comprises an inverse perspective mapping transform.

7. The image enhancing system of claim 1 wherein said transfer operation further comprises remapping said pixels from said first position to said second position.

8. The image enhancing system of claim 1 wherein said captured images are real-time continuous images received by said imaging device.

9. The image enhancing system of claim 1 wherein said imaging device includes at least one CMOS or CCD sensor based camera.

10. The image enhancing system of claim 1 wherein said image enhancing module generates said modified images comprising a plan view and a side view relative to said vehicle on said display unit such that the distance from a rear location of the vehicle to an object located at any distance the imaging device field-of-view is linearly proportional in said modified images.

11. The image enhancing system of claim 1 wherein said transfer operation further comprises remapping ground and non-ground images to form said modified images.

12. The image enhancing system of claim 1 wherein said transfer operation further comprises analyzing vehicle steering angle information for calculating a backup path illustrated in said modified images.

13. A method of enhancing an image in a vehicle imaging system comprising the steps of:

receiving captured images by at least one imaging device located on the vehicle;

communicating said captured images to an image enhancing module;

enhancing said captured images such that pixels located in said captured images are clustered and segmented to form at least one area of interest by referencing the pixels from a ground plane in the captured images and pixels located in said captured images are repositioned from a first position to a second position by a transfer operation to form modified images, said first position being expressed by $(X_a, Y_a)$, said second position being expressed by $(X_c, Y_c)$, and said transfer operation being performed in accordance with the formulas:

$$X_c = s*\cos\phi*X_a*(1+k_1\rho^2+k_2\rho^4) \text{ and}$$

$$Y_c = (s*\sin\phi*X_a+\cos\phi*Y_a)(1+k_1\rho^2+k_2\rho^4)$$

wherein, s is an aspect ratio of pixel unit, $\phi$ is a rectification angle, the lens distortion coefficients are $k_1$ and $k_2$ and $\rho = ((s*\cos\phi*X_a)^2+(s*\sin\phi*X_a+\cos\phi*Y_a)^2)^{1/2}$; and communicating said modified images from said enhancing module to a display unit located in said vehicle.

14. The method of claim 13 further comprising the step of adjusting at least one coefficient in the transfer operation by analyzing said captured images.

15. The method of claim 14 wherein the step of analyzing said captured images further comprises a calibration step where coefficients in the transfer operation are defined by locating substantially horizontal and/or substantially vertical lines in said captured images.

16. The method of claim 13 wherein the step of performing a transfer operation to form modified images is further achieved by executing an inverse perspective transform.

17. The method of claim 14 wherein the step of performing a transfer operation to form modified images is further achieved by executing an inverse perspective transform.

18. An image enhancing system for improving images received by an imaging device located on a vehicle, the image enhancing system comprising:

at least one camera located on said vehicle, the camera having a pixel array for receiving real-time captured images within the camera field of view;

a computing unit having an image enhancing module in communication with said camera for improving said captured images by repositioning pixels in said captured images from a first position, represented by coordinates (X, Y, and Z), to a second position, within a remapped domain, in accordance with a transfer operation performed by the image enhancing module such that the repositioning of the pixels form enhanced images, said second position is expressed by $(X_p, Y_p)$ and said transfer operation is performed in accordance with the formulas:

$$x_p = fX/Z \text{ and } y_p = fY/Z$$

wherein the parameter f is the distance of the remapped domain to an origin along an optical axis of the imaging device; and a display unit in communication with said computing unit and located within said vehicle for displaying said enhanced images.

19. The image enhancing system of claim 18 wherein at least one coefficient in said transfer operation is adjusted by analyzing said captured images.

20. The image enhancing system of claim 18 wherein said transfer operation further comprises an inverse perspective mapping transform.

21. A rearview image enhancing system for a vehicle comprising:

a display unit for displaying modified images enhanced by the image enhancing system;

an imaging device for receiving captured images enhanced by said image enhancing system;

an image enhancing module in communication with said display unit and said imaging device for improving said captured images by repositioning pixels in said captured images from a first position, represented by coordinates (X, Y, and Z), to a second position, within a remapped domain, in accordance with a transfer operation performed by the image enhancing module such that the repositioning of the pixels form enhanced images said second position is expressed by ($X_p$, $Y_p$) and said transfer operation is performed in accordance with the formulas:

$$x_p = fX/Z \text{ and } y_p = fY/Z$$

wherein the parameter f is the distance of the remapped domain to an origin along an optical axis of the imaging device; and said image enhancing module further comprising a clustering function configured to cluster and segment pixels located in said captured images to form at least one area of interest by referencing the pixels from a ground plane in the captured images to form said modified images, said clustered and segmented pixels being used to separate ground and non-ground regions in obtaining the area of interest.

22. The rearview image enhancing system of claim 21 wherein said clustered and segmented pixels used to form at least one area of interest are formed by evaluating the pixels in the captured image for similar image cues.

23. The rearview image enhancing system of claim 22 wherein said similar image cues include color, texture, and/or pixel intensity.

24. The rearview image enhancing system of claim 21 wherein said area of interest form pop-up objects in the modified images displayed on the display unit.

25. The rearview image enhancing system of claim 24 wherein said pop-up objects are located in the modified images relative to the ground plane.

26. The rearview image enhancing system of claim 24 further comprising a computing unit capable of predicting a collision with said pop-up objects based on a steering angle of the vehicle and the location of the pop-up objects in the modified image.

27. The rearview image enhancing system of claim 26 wherein said modified image includes a scale for indicating the distance between said pop-up objects and the vehicle.

* * * * *